Aug. 18, 1936.  H. N. FAIRBANKS  2,051,206
FILM MAGAZINE
Filed April 2, 1935
FIG.1.
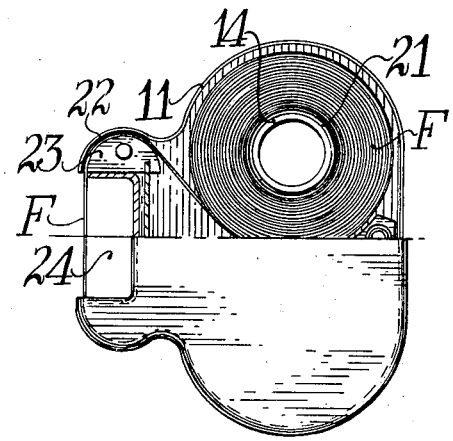
FIG.2.
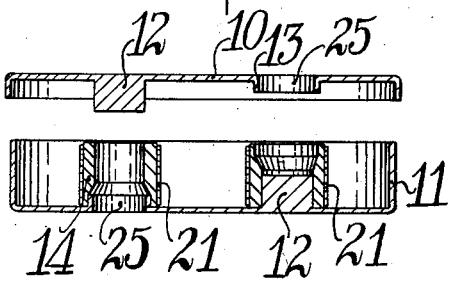
FIG.3.  FIG.4.
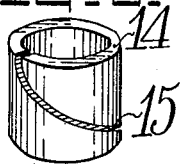 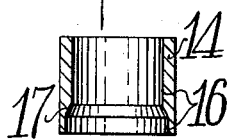
FIG.5.
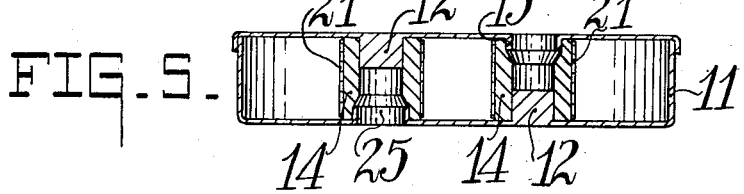
FIG.6.
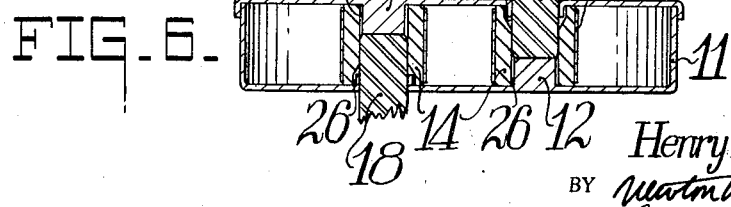
INVENTOR.
Henry N. Fairbanks,
BY
ATTORNEYS.

Patented Aug. 18, 1936

2,051,206

UNITED STATES PATENT OFFICE 2,051,206

FILM MAGAZINE

Henry N. Fairbanks, Rochester, N. Y., assignor to Eastman Kodak Company, Rochester, N. Y., a corporation of New York Application April 2, 1935, Serial No. 14,333

12 Claims. (Cl. 242—71)

This invention relates to photography and more particularly to a reversible film magazine for motion picture cameras.

To the users of motion picture cameras that are loaded with film which is placed in a suitable magazine by the supplier and not removed until received by the processor, it is an important feature that the magazine be equipped with some means for preventing any accidental unwinding of the film in the magazine during the shipment or handling thereof. Any film magazine is subject to a measurable amount of handling before it reaches the user, and in cases where two series of pictures are taken on one width of film, and the reversal of the magazine in the camera is required to fully expose the film, it is obvious, that in film magazines, in which there are no take up restraining features for the film rolls, a certain amount of film might be wasted due to its accidental unwinding in the magazine.

Therefore, one object of my invention is to provide a film magazine in which the film cores are restrained against accidental unwinding during the handling thereof.

Another object is to provide a film magazine, which when inserted in the proper camera, will engage means for releasing the restraining mechanism on the film cores and allow the driving of the take up film core.

And another object is to provide a film spooling system in which it will be impossible for the operator to operatively place the film spooling system in the camera in any position other than the correct position.

Briefly, my invention consists of a film magazine, the cover and body portions of which have cooperating studs and ring seats for locating and being frictionally engaged by a film core which is helically slotted to make it expansible and normally compressed. When the film magazine is inserted in the proper camera, the take-up shaft and a freely rotatable spindle, which are suitably positioned in the camera, engage the ringed seats of the magazine and enter the cores of the film spools. Due to the size of the shaft and spindle, which enter the film cores, and the peculiar construction of the inner wall of the cores, an expansion of the film cores is brought about which releases these cores from their restraining means within the magazine and allows the take-up spool to be operated by the take-up shaft. The removal of the magazine from the camera will obviously cause a reversal of the process, and allow the film cores to compress and again frictionally engage these positioning means within the magazine to prevent any accidental unwinding of the film during handling.

The novel characteristics that I consider characteristic of my invention are set forth with particularity in the appended claims. The invention, itself, however, both as to its organization and its method of operation, together with additional objects and advantages thereof, will best be understood from the following description of specific embodiments when read in connection with the accompanying drawing in which:

Fig. 1 is a top plan view of a film magazine with one half of its cover removed to show the location of one film core and the path of the film;

Fig. 2 is a rear elevation in section of the magazine, illustrated in Fig. 1, with the film removed and the cover in a raised position;

Fig. 3 is an enlarged perspective of the film core showing the helical slot;

Fig. 4 is an enlarged elevation in section of the film core, illustrated in Fig. 3, showing the bore construction of said core;

Fig. 5 is an elevation in section of the empty film magazine out of the camera; and, Fig. 6 is an elevation in section of the empty film magazine as it would be in a camera.

As illustrated, the film magazine comprises a cover 10 and a body portion 11, which will be hereinafter referred to as the magazine 11. The cover 10 and the body portion 11 of the magazine are each provided with a stud 12 and a seating ring 13 so located, on the respective parts, that as the cover 10 is placed on the magazine 11, the stud 12 on one is vertically opposite the seating ring 13 on the other, so that each of the film cores 14 are located at opposite ends by a stud 12 and a seating ring 13, said stud 12 and seating ring 13 acting as journal bearings for the film cores.

The film cores 14 are made of a resilient material, preferably metal, and are each provided with a helical slot 15 to render them expansible and normally compressed. The cores 14 are normally compressed so that when they are located in the magazine, on the studs 12 and the seating rings 13, they frictionally engage these two parts to prevent any accidental unwinding of the film during handling of the magazine. The engaging portion of the seating ring 13 is of greater diameter than that of the stud 12, the purpose of which is shown below, so that the interior of the cores 14 have to be restricted as shown by 16, Fig. 4, and these two diameters are connected by a cam surface 17. The inside diameter of the seating rings 13 are slightly larger than the diameters of the studs 12 and are so located that as the magazine is placed in a camera, the openings formed by seating rings 13, are engaged by the take-up shaft 18 of the camera and any other rotatable spindle 19, of the same diameter as the take-up shaft 18, said shaft 18 and spindle 19 being so located in the camera that they simultaneously engage the openings 25 in the magazine 11. Since the shaft 18 and the spindle 19 are of a diameter to engage the interior of the ring seats 13, they must necessarily be slightly larger than the diameters of the studs 12. Then as the magazine is forced down over take-up shaft 18 and the spindle 19, they engage the cam portions 17 in the interior of the cores and cause the cores 14 to be expanded. This expansion of the cores 14 relieves the frictional engagement between them and the seating rings 13 and the studs 12, as shown in Fig. 6, by the reference character 26, and at the same time provides a frictional contact between the take-up shaft 18 and the core 14 to affect the control of the take-up core. The spindle 19 may be mounted in the camera to rotate freely therewith, or a given amount of friction might be set up therebetween in order to give a certain amount of tension to the supply core to prevent any possibility of the supply unwinding faster than the take-up would receive it.

When it is found necessary to remove the magazine from the camera, for any reason whatsoever, the removal of the shaft 18 and the spindle 19, from the cores 14, allows these normally compressed cores 14 to again frictionally engage the studs 12 and the seating rings 13, and thereby restrain the film cores against accidental unwinding while said magazine is out of the camera.

As shown in Fig. 1, the user purchases the film entirely enclosed in the magazine 11. In a magazine of this type the supply and take-up cores for the film are mounted in opposite ends of the magazine compartment. The end of the film strip is led off from the supply reel and through a suitable channel 22, which is formed between the wall of the magazine body 11, and a guide block 23. It is then led across the mouth 24 of the magazine to the take-up reel which is not shown. For the purpose of illustration, I have shown the end of the film strip F fastened to the film cores by means of the usual type of spring clip 21.

To load a camera with this magazine, the magazine is inserted into the camera to engage a suitable take-up shaft 18 and a spindle 19, as described above, for releasing the core gripping means. The loop of film F, across the mouth 24 of the magazine, is enlarged until it is sufficiently long to be threaded over a given path in the moving picture apparatus, then the cover of the camera is replaced and the camera is ready for operation. In picture taking, wherein a magazine of this type is used, there should be no reason for the cover of the magazine being removed from the time that the magazine leaves the supplier until it reaches the processor.

If this type of magazine were used in cases where two series of pictures are taken on the same width of film, this particular magazine and its novel engagement with shafts on the camera would prove advantageous. Because, as this particular type of exposure requires the reversal of the magazine; the definite location of the shaft 18, the spindle 19, and the openings 25 in the magazine as described above, insures the operator against double exposure by necessitating a complete turn over of the magazine before satisfactory engagement with the camera parts 18 and 19 can be accomplished.

In practice this magazine is loaded by the supplier, and the user receives it with the bulk of the film on the supply core. To load the magazine, the supplier merely removes the cover 10 and forces the two film cores 14, supply and take-up, onto the studs 12 and the seating rings 13, respectively, which are located on the bottom of the magazine 11. The cover 10 of the magazine is then placed on the magazine body 11, said cover 10 being provided with a stud 12 and a seating ring 13 in such a relation that each core 14 frictionally engages a stud 12 and a seating ring 13. This frictional engagement between the cores 14 and the studs 12 and rings 13 is due to a gripping action caused by the normally compressed cores 14, and accidental unwinding of the film is prevented thereby during handling.

When the magazine is placed in operating position in the camera, the take-up shaft 18 and a rotatable spindle 19, engage the seating rings 13 in the magazine; and by virtue of their size, and their cooperation with the restricted interiors 16 of the cores 14, and cam surfaces 17 in the restricted interiors of the cores 14, the cores 14 are expanded enough to release them from the studs 12 and the seating rings 13, as shown in Fig. 6. This frictional release is supplemented by a frictional engagement between the take-up shaft 18, the freely rotatable spindle 19, and the cores 14 to effect the driving control of the take-up core by the take-up shaft 18. A removal of the magazine from the camera reverses this order, and as the shaft 18 and the spindle 19 leaves the cores 14, the cores 14 again compress to frictionally engage the studs 12 and the seating rings 13 to prevent any accidental unwinding of the film and subsequent waste thereof.

Although I have shown and described certain specific embodiments of my invention, I am fully aware that many modifications thereof are possible. My invention, therefore, is not to be restricted except in so far as is necessitated by the prior art and by the spirit of the appended claims.

What I claim as my invention and desire to secure by Letters Patent of the United States is:

1. In a film package for continuous film, the combination of, a container having a removable cover, supports mounted on the cover and on one wall of the container for supporting a coil of film, and an expansible core for the film coil, said core being normally compressed to frictionally engage said supports when mounted thereon.

2. A film magazine for continuous films, comprising a container having a removable cover, supports mounted on the cover and one wall of the container for supporting a coil of film, an expansible core for the film roll, said core being normally compressed to frictionally engage said supports on said cover and said container when mounted thereon, at least one of said supports having an opening to permit a spindle to enter the container and assume control of the film roll therein.

3. A film magazine comprising a container having opposite parallel walls, journal bearings mounted on said walls for supporting a coil of film, a film core having a helical slot, said core being expansible and normally compressed to frictionally engage said journal bearings when mounted thereon, one of said journal bearings having an opening to permit a spindle to enter the magazine and assume control of the film roll therein.

4. A film magazine comprising a container having opposite parallel walls, journal bearings mounted on said walls for supporting a coil of film, a film core having a slot, said core being expansible and normally compressed to frictionally engage the journal bearings when mounted thereon.

5. A film magazine comprising a container having opposite parallel walls, journal bearings mounted on said walls for supporting a film core, said film core being expansible and normally compressed to frictionally engage the journal bearings when supported thereon.

6. In a film magazine the combination of a container having opposite parallel walls, journal bearings mounted on said walls for supporting the take-up and supply rolls of film, said journal bearings consisting of a stud and a seating ring located in each wall, the seating ring in one wall being in axial alignment with the stud in the other wall, and film cores having helical slots, said cores being expansible and normally compressed to frictionally engage the journal bearings when mounted thereon.

7. The combination with a film magazine comprising a closed container having opposite parallel walls, journal bearings located on said walls for supporting the take-up and supply rolls of film, said journal bearings consisting of a stud and a seating ring located on each of said walls, the stud on one wall being in axial alignment with the seating ring on the opposite wall, film cores having helical slots and restricted bores, said cores being expansible and normally compressed to frictionally engage said journal bearings when mounted thereon, said seating rings having openings, of a drive shaft and a rotatable spindle suitably mounted externally of said magazine to enter said openings in the seating rings and expand said film core and assume driving control thereof.

8. The combination with a film magazine comprising, a closed container having opposite parallel walls, journal bearings located on said walls for supporting the take up and supply rolls of film, said journal bearings consisting of a stud and a seating ring located on each of said walls, the stud on one wall being in axial alignment with the seating ring in the opposite wall, film cores having helical slots and restricted bores, said cores being expansible and normally compressed to frictionally engage said journal bearings when mounted thereon; said seating rings having openings, of a pair of spindles external of said magazine, suitably positioned to enter said openings in the seating rings for expanding said film cores and releasing them from said journal bearings.

9. The combination with the film magazine comprising a container having opposite walls, journal bearings on said walls, an expansible core for a film roll and normally compressed for frictionally engaging the journal bearings when supported thereon, one of said journal bearings having an opening, of a rotatable spindle adapted to enter the magazine and assume control of the film roll therein.

10. The combination with a film magazine comprising a container having opposite walls, journal bearings mounted on said walls, and consisting of a stud and a seating ring located on each of said container walls, the seating ring in one wall being in axial alignment with the studs in the opposite wall, expansible film cores, said cores being normally compressed to frictionally engage the journal bearings when mounted thereon, said seating rings having openings, of a pair of rotatable spindles adapted to enter said openings in the seating rings to expand and assume control of the film rolls thereon.

11. The combination with a film magazine comprising a container having opposite parallel walls, journal bearings mounted on said walls and consisting of a stud and a seating ring of different sizes located on each of said walls, a seating ring in one wall being in axial alignment with the stud in the opposite wall, film cores having helical slots, said cores being expansible and normally compressed, the internal diameters of said cores having restricted portions for frictionally engaging the journal bearings, said restricted portions being joined by a cam surface, said seating rings having openings, of a pair of rotatable spindles adapted upon operative association with said magazine to enter the openings in said journal bearings and expand said cores for free rotation with respect to said journal bearings.

12. The combination with a film magazine comprising a container having opposite parallel walls, a stud and a seating ring located on each wall, the stud in one wall being in axial alignment with the seating ring in the opposite wall, each wall having an opening enclosed by the seating ring on said wall, two cores having helical slots and being normally compressed to frictionally engage a stud on one wall and a seating ring on the opposite wall, restricted bores in the cores having cam surfaces, of a pair of rotatable spindles adapted to engage alternate openings in the wall of the magazine when said magazine is brought into operative association therewith, said engagement affecting an expansion of the cores to release said cores from the studs and seating rings and effect a frictional engagement between the cores and said spindles.

HENRY N. FAIRBANKS.